United States Patent
Dickers et al.

(10) Patent No.: US 10,794,476 B2
(45) Date of Patent: *Oct. 6, 2020

(54) HYDRAULIC CONTROL DEVICE AND METHOD FOR CONTROLLING A DUAL CLUTCH TRANSMISSION HAVING A CONTROL DEVICE

(71) Applicant: GETRAG FORD TRANSMISSIONS GMBH, Cologne (DE)

(72) Inventors: Guido Dickers, Moenchengladbach (DE); Oliver Poetz, Pulheim (DE); Klaus Badke, Bergish Gladbach (DE)

(73) Assignee: Getrag Ford Transmissions GmbH, Cologne (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/191,253

(22) Filed: Nov. 14, 2018

(65) Prior Publication Data

US 2019/0390766 A1 Dec. 26, 2019

(30) Foreign Application Priority Data

Nov. 15, 2017 (DE) .................. 10 2017 220 369

(51) Int. Cl.
*F16H 61/02* (2006.01)
*B60W 10/113* (2012.01)
(Continued)

(52) U.S. Cl.
CPC ....... *F16H 61/0276* (2013.01); *B60W 10/113* (2013.01); *F16H 61/0267* (2013.01); *F16H 61/431* (2013.01); *F16H 61/688* (2013.01)

(58) Field of Classification Search
CPC .............. B60W 10/113; F16H 61/0276; F16H 61/0267; F16H 61/431; F16H 61/688
See application file for complete search history.

(56) References Cited

U.S. PATENT DOCUMENTS 10,316,954 B2 * 6/2019 Song ............... F16H 57/0412
2005/0252326 A1 * 11/2005 Mueller ............... F15B 11/044
74/335
(Continued)

FOREIGN PATENT DOCUMENTS

CN 103228961 A 7/2013
CN 103807428 A 5/2014
(Continued)

OTHER PUBLICATIONS

English translation of first office action in the Chinese patent application 201811360283.5—which is a patent family member of the incident patent application.

*Primary Examiner* — Stacey A Fluhart
(74) *Attorney, Agent, or Firm* — Alexander R. Schlee; Schlee IP International, PC

(57) ABSTRACT

Hydraulic control device for an automated dual clutch transmission having first and second clutches with first and second sub-transmissions and also a gear shifting system. The hydraulic control device has a regulating unit that predetermines at least one regulated pressure and/or one regulated volume flow for actuating the first and second clutches and shifting system. The hydraulic control device has a switching device that is arranged between the regulating unit and the clutches or the shifting system, switching the regulated pressure or volume flow to the clutches or the shifting system. The regulating unit includes a first regulating valve and a second regulating valve that is connected to an oil pressure supply having a system pressure regulator and an electric oil pump.

8 Claims, 4 Drawing Sheets

(51) Int. Cl.
*F16H 61/431* (2010.01)
*F16H 61/688* (2006.01)

(56) References Cited

U.S. PATENT DOCUMENTS

| | | | |
|---|---|---|---|
| 2011/0314945 A1* | 12/2011 | Brandenburg | F16H 61/0031 74/473.11 |
| 2014/0094343 A1 | 4/2014 | Pietron et al. | |
| 2015/0192179 A1* | 7/2015 | Armiroli | F16D 48/062 192/3.58 |
| 2017/0268666 A1* | 9/2017 | Ghike | F16H 61/0021 |

FOREIGN PATENT DOCUMENTS

| | | |
|---|---|---|
| CN | 105593576 A | 5/2016 |
| DE | 10120113 | 10/2002 |
| DE | 102007056175 | 5/2009 |
| EP | 1950463 | 12/2010 |

* cited by examiner

HYDRAULIC CONTROL DEVICE AND METHOD FOR CONTROLLING A DUAL CLUTCH TRANSMISSION HAVING A CONTROL DEVICE

CROSS-REFERENCE TO RELATED APPLICATION

This application claims the priority of the German patent application DE 102017220369.2 having a filing date of Nov. 15, 2017. The entire content of this prior German patent application 102017220369.2 is herewith incorporated by reference.

FIELD OF THE INVENTION

The invention relates to a hydraulic control device for an automated dual clutch transmission that comprises a first clutch having a first sub-transmission and a second clutch having a second sub-transmission and also a shifting system for shifting into/out of gears of the two sub-transmissions, said hydraulic control device having a regulating unit that predetermines at least one pressure that may be regulated and/or one volume flow that may be regulated for actuating the first and second clutch and for actuating the shifting system, and said hydraulic control device having a switching device that is arranged between the regulating unit and the clutches or the shifting system and by means of said switching device it is possible to switch the pressure that may be regulated or the volume flow that may be regulated to the clutches or the shifting system, wherein the regulating unit comprises a first regulating valve and a second regulating valve that is connected to an oil pressure supply having a system pressure regulator and an electric oil pump.

Furthermore, the invention relates to a method for controlling a dual clutch transmission having a control device.

BACKGROUND OF THE INVENTION

Dual clutch transmissions have been known for a long time and are preferably used in motor vehicles. A dual clutch transmission in general comprises two sub-transmissions that are allocated a separate clutch and a group of gears respectively. Owing to the considerable mechanical outlay for actuating the two clutches and also for shifting the gears of the two sub-transmissions, dual clutch transmissions are mostly embodied in an automated manner, in other words that both the actuation of the clutches as well as the shifting of the gears are performed via allocated auxiliary drives that may be embodied by way of example in the form of hydraulically influenced control elements that are controlled by means of a hydraulic control device.

EP 1950463 B1 provides a hydraulic control device for an automated dual clutch transmission that is constructed in a simple, cost-effective and compact manner and that in the event of a failure of a regulating valve makes as many gears as possible available without posing a safety risk in order to be able to drive further in the emergency mode with a motor vehicle that is fitted with a dual clutch transmission.

However, during shifting procedures pressure peaks occur by means of actuating the shifting forks in the hydraulic control system that may lead to the fact that the electric pump that supplies the system with a desired pressure is heavily loaded, which leads to a high degree of wear and premature wear or even switches the electric pump off.

However, in addition to the normal control tasks of the hydraulic system, it is also necessary to compensate for pressure fluctuations.

Additional valves are used in the prior art in order to reduce such pressure peaks. DE 10120113 A1 thus discloses a clutch system comprising a clutch device that is to be arranged in particular in a drive train between a drive unit and a transmission, and said clutch system also comprising an actuating device for actuating the clutch device in a hydraulic manner by means of at least one hydraulic slave cylinder, wherein the actuating device comprises a hydraulic medium-providing device, which provides hydraulic medium that is under pressure, and a valve arrangement, by means of which a hydraulic medium may be rapidly supplied to a hydraulic system section that is allocated to the slave cylinder and therefore to the slave cylinder and also by means of said valve arrangement hydraulic medium may be rapidly discharged out of the hydraulic system section and therefore out of the slave cylinder. The valve arrangement comprises at least one proportional valve that is used so as to control/regulate the supply of hydraulic medium into the slave cylinder or so as to control/regulate the discharge of hydraulic medium out of the slave cylinder.

SUMMARY OF THE INVENTION

The object of the invention is to propose a control device and also a method for controlling a hydraulic clutch system that does not require additional components and actively compensates the foreseeable pressure peaks.

The object is achieved with a hydraulic control device for an automated dual clutch transmission that comprises a first clutch having a first sub-transmission and a second clutch having a second sub-transmission and also a shifting system for shifting into/out of gears of the two sub-transmissions, said hydraulic control device having a regulating unit that predetermines at least one pressure that may be regulated and/or one volume flow that may be regulated for actuating the first and second clutch and for actuating the shifting system, and said hydraulic control device having a switching device that is arranged between the regulating unit and the clutches or the shifting system and by means of said switching device it is possible to switch the pressure that may be regulated or the volume flow that may be regulated to the clutches or the shifting system, wherein the regulating unit comprises a first regulating valve and a second regulating valve that is connected to an oil pressure supply having a system pressure regulator and an electric oil pump, wherein an electronic regulator is connected to the system pressure regulator.

It is possible using the electronic regulator to damp pressure peaks that occur in the system on account of the shifting procedure.

For this purpose, the electronic regulator comprises at least one monitoring unit for the position of shifting forks, and a system pressure controller.

For this purpose, the monitoring unit must be connected at least to inputs for oil temperature and the desired system pressure in order to produce a compensating signal.

It is advantageous that the system pressure controller emits a regulating signal for the system pressure regulator at least from the compensating signal and the desired system pressure.

The object is further achieved by virtue of a method for controlling a dual clutch transmission having a control device, wherein a shifting point is calculated using the input data of a desired system pressure and the oil temperature, the system pressure being adjusted to said shifting point by means of adjusting a flow at the system pressure valve.

It is advantageous that in the next step a feedback signal from the calculated desired system pressure is used in order to prepare a calculated pressure reduction at the shifting point by means of the compensating signal.

For this purpose, the position of the shifting fork in the transmission is evaluated in the monitoring unit.

In this case, it is advantageous that a yes/no query checks whether the shifting fork is particularly near to the engagement point or is particularly near to the neutral position and corresponding reactions are therefore prepared.

If the query is negative and the shifting fork is not in the critical vicinity, in this case a compensating signal is not sent, if the query identifies that the shifting fork is in the critical vicinity, a compensating signal is output.

DETAILED DESCRIPTION OF THE DRAWINGS

Figure 1:
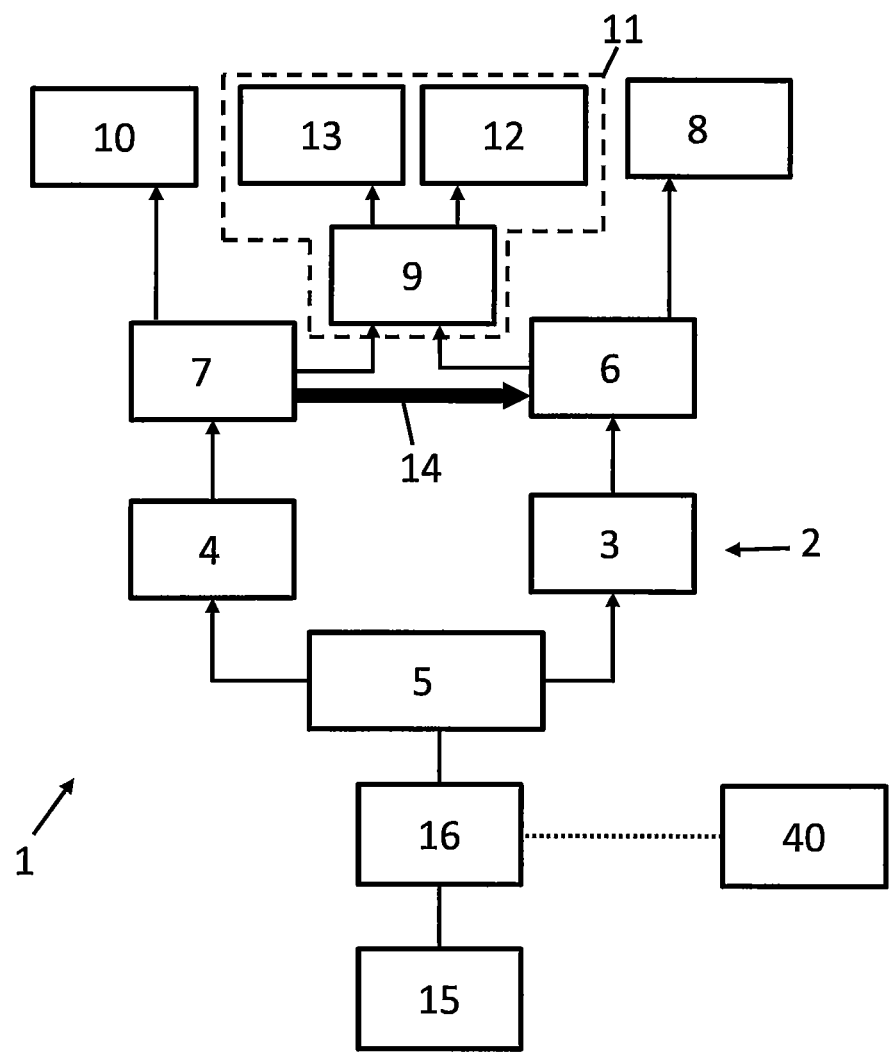
FIG. 1 is a schematic block diagram of a hydraulic control device according to an exemplary embodiment the invention.

FIG. 1 illustrates in a schematic exemplary view a hydraulic control device 1 in accordance with the invention as said device may be used for the invention. The control device 1 comprises a regulating unit 2 having a first regulating valve in the form of a pressure regulator 3 and having a second regulating valve in the form of a pressure regulator 4. On the input side, the two pressure regulators 3, 4 are connected to a pressure oil supply 5 having an electric pump 15 and a system pressure regulator 16. The system pressure regulator 16 is actuated by an electronic controller 40.

A first switching valve 6 is allocated to the first pressure regulator 3 and a second switching valve 7 is allocated to the second pressure regulator 4. The first switching valve 6 allows the first pressure regulator 3 to connect either to a first clutch 8 or to a path selector or to a group selection 9. The second switching valve 7 permits a regulated pressure of the second pressure regulator 4 to switch either to the group selection 9 or to a second clutch 10.

The use of the control device 1 renders it possible to control a dual clutch transmission that is installed in a motor vehicle and comprises two separate clutches and also comprises multiple control elements or actuators by means of which it is possible to shift into or shift out of individual gears of the transmission. The dual clutch transmission comprises a first and second sub-transmission that are allocated to the first or second clutch. If a pressure is provided at a clutch cylinder of a clutch, the clutch that is otherwise held open by means of a resilient force is closed. In the closed state, the clutch transmits a torque between a drive unit of the motor vehicle and the associated sub-transmission.

The group selection 9 is part of a shifting system 11 that comprises a first group of actuators 12 and a second group of actuators 13 that move shifting forks. It is rendered possible by means of the first group of actuators 12 to shift into and out of the gears of the first sub-transmission, whilst the second group of actuators 13 is responsible for shifting into and out of the gears of the second sub-transmission. The group selection 9 in this case guides the regulated pressure of the regulating unit 2 either to the first group of actuators 12 or to the second group of actuators 13. Moreover, the shifting system 11 comprises further switching valves that are however not illustrated in order to be able to precisely control an individual actuator or one of the chambers of said actuator.

A clearly emphasised arrow 14 in FIG. 1 is to illustrate in an exemplary manner a direction in which the shifting device 1 in a specific shifting constellation produces a connection between the second switching valve 7 and the first switching valve 6. This connection renders it possible for the second pressure regulator 4 to influence the first clutch 8 with regulated pressure via the switching valves 7, 6. If the connection is produced in accordance with arrow 14, the second clutch 10 is not placed under pressure. In this case, said second clutch is separated both from the first pressure regulator as well as from the second pressure regulator.

Figure 3:
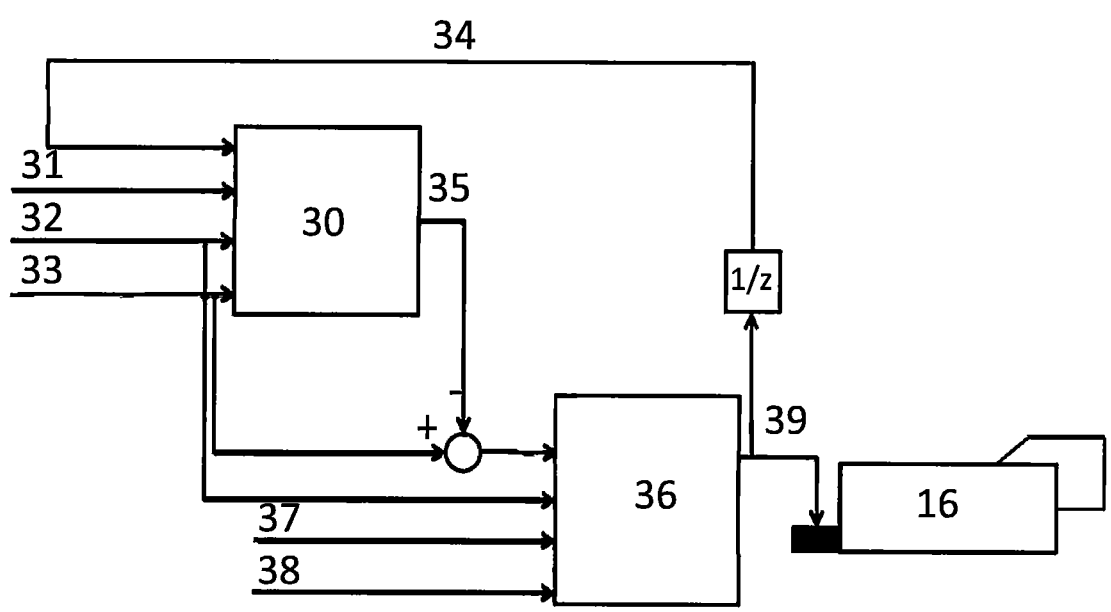
FIG. 3 is a schematic block diagram of an electronic controller as an electronic regulator of the control unit.

FIG. 3 illustrates the electronic regulator of the control unit 1, the electronic controller 40.

A system pressure controller 36 regulates the system pressure to a predetermined desired system pressure 33. This regulating variable is fed together with the regulating variables of the shifting fork position 31 and the oil temperature 32 into a monitoring unit 30. The last calculated desired system pressure 34 prevails as a feedback signal. The monitoring unit 30 is connected on the output side to the system pressure controller.

The regulating procedure in the system pressure controller 36 is actuated on the input side using the desired system pressure 33, said pressure being additively corrected using a compensating signal 35. Further input signals are the desired torque that is to be transmitted to the clutch 37, and also optionally further information 38 from the system.

On the output side, the system pressure controller 36 provides a prevailing desired system pressure 39, said system pressure prevailing at the system pressure regulator 16, and also being fed back to the monitoring unit 30.

Figure 2:
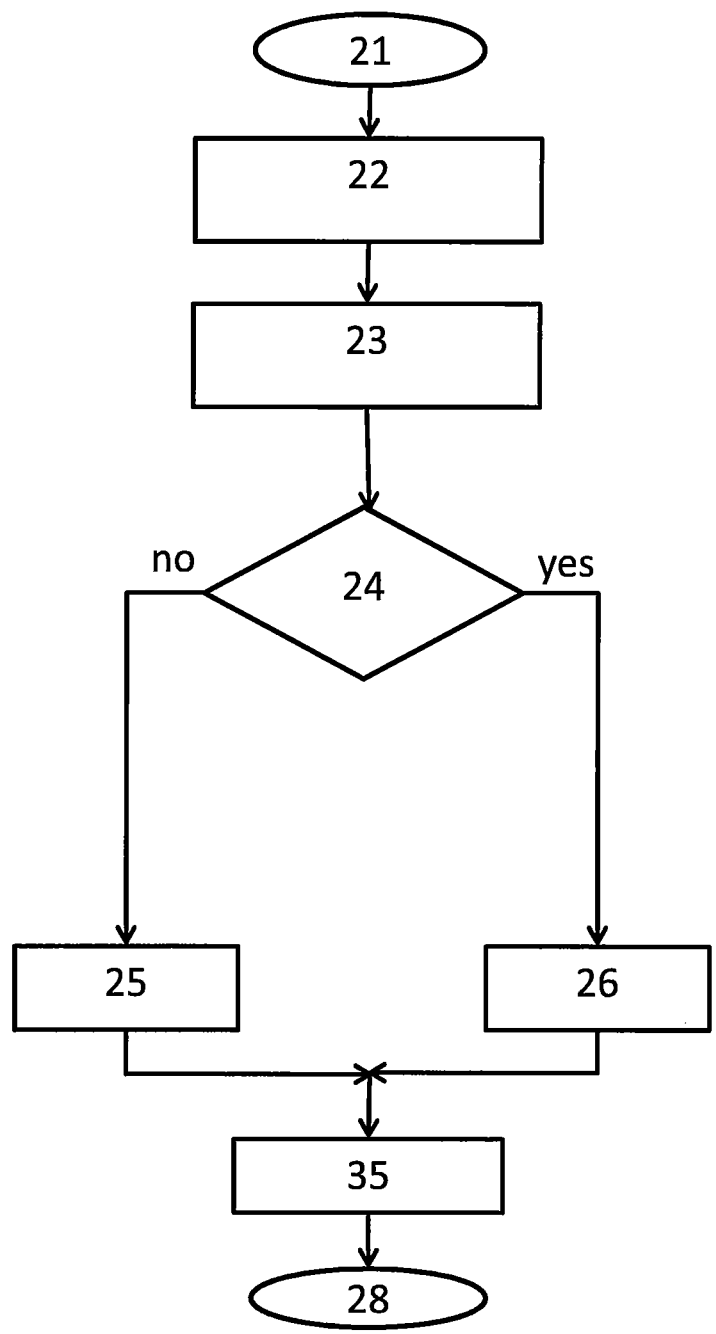
FIG. 2 is a flow chart demonstrating method steps according to an embodiment of the invention as performed by a monitoring unit for providing a compensating signal.

The monitoring unit 30 performs the procedure that is illustrated in FIG. 2 for providing a compensating signal 35. A shifting point is calculated with a start 21 using the input data of the desired system pressure 33 and the oil temperature 32, the system pressure being adjusted to said shifting point by means of adjusting a flow at the system pressure regulator 16. This occurs in step 22.

In step 23, a feedback signal from the calculated desired system pressure 34 is used in order to prepare a calculated pressure reduction at the shifting point by means of a compensating signal.

In step 24, the position of the shifting fork is evaluated in the monitoring unit. The yes/no query checks whether the shifting fork is particularly near to the engagement point or is particularly near to the neutral position.

If the query is negative and the shifting fork is not in the critical vicinity, the procedure continues on the side with "no". In step 25, a control variable is set to zero and a compensating signal 35 is not sent. The procedure stops in step 28.

If the monitoring unit identifies in step 24 that the shifting fork is in the critical vicinity, a control variable is generated in step 26 and is transferred as a compensating signal 35.

Figure 4A:
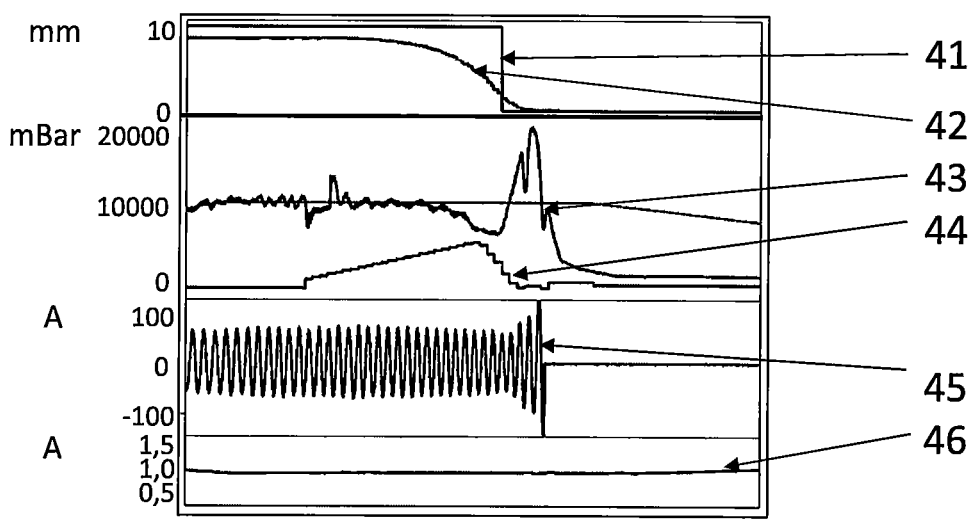
FIG. 4a shows first graphs of displacements, signals, pressures and flows over time for a first regulating scenario.
Figure 4B:
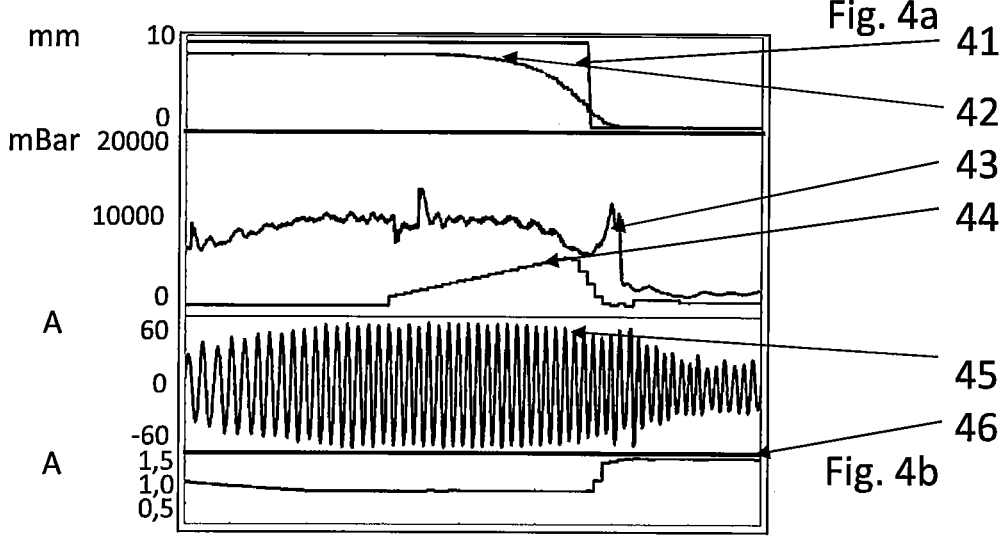
FIG. 4b shows second graphs of displacements, signals, pressures and flows over time for a second regulating scenario.
Figure 4C:
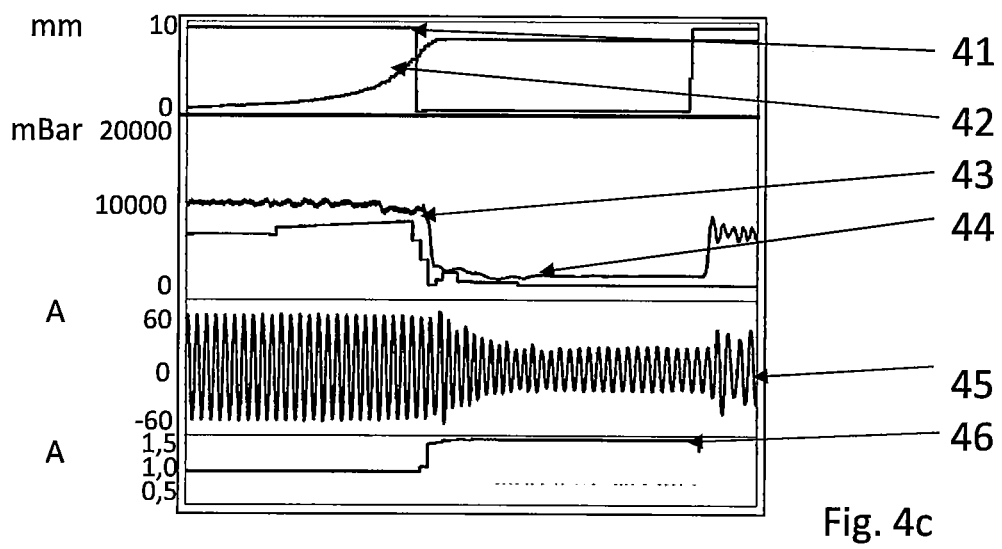
FIG. 4c shows third graphs of displacements, signals, pressures and flows over time for a third regulating scenario.

In FIGS. 4*a*, 4*b* and 4*c*, the curves of displacements, signals, pressures and flows are sketched as temporal curves for different regulating scenarios.

FIG. 4*a* illustrates a shifting procedure without the regulating procedure in accordance with the invention.

The two uppermost curves 41 and 42 are plotted as a displacement of the shifting fork position in mm over the time. The curve 41 illustrates the curve of the trigger signal for reducing the system pressure that only occurs if the movement of the shifting fork, illustrated with the graph 42, has already been performed up to a few mm away from the neutral position. The shifting pressure is used so as to move the shifting fork, said shifting pressure being illustrated in curve 44 and leading to a reverse reaction of the system pressure.

The two curves 43 and 44 are plotted as pressure curves in mBar over the time. The system pressure follows the curve 43, falls with the displacement of the shifting fork and reacts with pressure peaks if the shifting fork has arrived at the end position. These pressure peaks in the system pressure generate an increase of the phase current at the pump, such as in curve 45, illustrated up to a value at which the pump is switched off in the worst case to protect itself. This is because the pump tries to maintain the desired pressure using an open system pressure regulator 16. The curve of the regulating current of the system pressure regulator 16 illustrates in curve 46 that the system pressure regulator is simultaneously open and a procedure of controlling its regulating flow is not performed.

FIG. 4*b* illustrates the same curves in a scenario in which a gear is selected using a regulating procedure according to the above described method.

The system pressure regulator 16 is initially opened and is closed at a trigger point in time with the result that the pump phase current reduces and the system pressure drops. The system pressure, at the point in time in which the shifting fork is in the example 2 mm away from the point of engagement, is already in the critical vicinity, is reduced by means of increasing the valve current 46 to the minimum still feasible system pressure. As a consequence, the pump operates against a part-opened valve and may maintain the pressure in the system without encountering problems. As a consequence, the pressure peaks are reduced in their height and the pump continues undisturbed as the phase current 45 illustrates.

In FIG. 4*c*, the scenario when shifting into a gear becomes clear. In this figure, the trigger occurs in the case of a 6.5 mm displacement path of the shifting fork. The current 46 of the system pressure regulator 16 is reduced and is increased at the trigger point in time. The system pressure 43 is reduced and pressure peaks do not occur. The pump continues undisturbed with its reduced phase current 45 until the valve is closed again and the pump must again generate the system pressure.

LIST OF REFERENCE NUMERALS

1 Control device
2 Regulating unit
3 First pressure regulator
4 Second pressure regulator
5 Oil pressure supply
6 First switching valve
7 Second switching valve
8 First clutch
9 Group selection
10 Second clutch
11 Shifting system
12 First group of actuators
13 Second group of actuators
14 Arrow
15 Pump
16 System pressure regulator
40 Electronic controller
30 Monitoring unit
31 Shifting fork position
32 Oil temperature
33 Desired system pressure
34 Last calculated desired system pressure
35 Compensating signal
36 System pressure controller
37 Desired clutch torque
38 Further input data
41 Trigger signal
42 Movement of the shifting fork
43 System pressure
44 Shifting pressure
45 Phase current
46 Valve current

What is claimed is:

1. Hydraulic control device for an automated dual clutch transmission that comprises a first clutch having a first sub-transmission and a second clutch having a second sub-transmission and also shifting fork actuators for shifting into/out of gears of the two sub-transmissions, said hydraulic control device having a regulating unit that predetermines at least one pressure that may be regulated and/or one volume flow that may be regulated for actuating the first and second clutch and for actuating the shifting fork actuators, and said hydraulic control device having one or more switching valves arranged between the regulating unit and the clutches or the shifting fork actuators and by means of said one or more switching valves it is possible to switch the pressure that may be regulated or the volume flow that may be regulated to the clutches or the shifting fork actuators, wherein the regulating unit comprises a first regulating valve and a second regulating valve that is connected to an oil pressure supply having a system pressure regulator and an electric oil pump, wherein an electronic regulator is connected to the system pressure regulator; wherein the electronic regulator comprises at least one monitoring unit for the position of shifting forks, and a system pressure controller; and wherein the monitoring unit is connected at least to inputs for inputting input data for oil temperature and a desired system pressure and produces a compensating signal.

2. Control device according to claim 1, wherein the system pressure controller emits a regulating signal for the system pressure regulator at least from the compensating signal and the desired system pressure.

3. Method for controlling a dual clutch transmission having a control device according to claim 1, wherein a shifting point being calculated using the input data of a desired system pressure and the oil temperature, the system pressure being adjusted to said shifting point by means of adjusting a flow at the system pressure regulator.

4. Method according to claim 3, wherein in the next step a feedback signal from the calculated desired system pressure is used in order to prepare a calculated pressure reduction at the shifting point by means of the compensating signal.

5. Method according to claim 3, wherein in the next step the position of the shifting fork in the transmission is evaluated in the monitoring unit.

6. Method according to claim 5, wherein the yes/no query checks whether the shifting fork is particularly near to the engagement point or is particularly near to the neutral position.

7. Method according to claim 6, wherein if the query is negative and the shifting fork is not in the critical vicinity, the compensating signal is not sent.

8. Method according to claim 6, wherein if the query identifies that the shifting fork is in the critical vicinity, the compensating signal is output.

* * * * *